United States Patent
Baker et al.

(10) Patent No.: US 9,684,975 B2
(45) Date of Patent: Jun. 20, 2017

(54) METHOD AND SYSTEM FOR FILTERING OF VISUAL OBJECTS

(75) Inventors: Daniel Baker, Towson, MD (US); Marc Olano, Washington, DC (US)

(73) Assignee: Take-Two Interactive Software, Inc., New York, NY (US)

( * ) Notice: Subject to any disclaimer, the term of this patent is extended or adjusted under 35 U.S.C. 154(b) by 399 days.

(21) Appl. No.: 13/401,832

(22) Filed: Feb. 21, 2012

(65) Prior Publication Data
US 2013/0021359 A1    Jan. 24, 2013

Related U.S. Application Data

(60) Provisional application No. 61/444,129, filed on Feb. 18, 2011.

(51) Int. Cl.
| | |
|---|---|
| *G09G 5/00* | (2006.01) |
| *G06T 11/00* | (2006.01) |
| *G06T 15/04* | (2011.01) |

(52) U.S. Cl.
CPC ............ *G06T 11/001* (2013.01); *G06T 15/04* (2013.01); *G06T 2200/12* (2013.01)

(58) Field of Classification Search
CPC .... G06T 11/001; G06T 15/04; G06T 2200/12
USPC ......... 345/582–584, 587, 611; 382/260, 263, 382/264, 269, 274
See application file for complete search history.

(56) References Cited

U.S. PATENT DOCUMENTS

2002/0080136 A1*   6/2002   Kouadio ...................... 345/582

OTHER PUBLICATIONS

Author={Ping Tan and Lin, S. and Long Quan and Baining Guo and Heung-Yeung Shum}, title={Filtering and Rendering of Resolution-Dependent Reflectance Models},journal={Visualization and Computer Graphics, IEEE Transactions on} year={2008}, vol. {14}, pp. {412-425}.*
Author = {Schlick, Christophe}, title = {An Inexpensive BRDF Model for Physically-based Rendering}, year = {1994}, publisher = {Blackwell Science Ltd}, vol. {13}, No. {3} pp. {233-246}.*

* cited by examiner

*Primary Examiner* — Jacinta M Crawford
*Assistant Examiner* — Terrell Robinson
(74) *Attorney, Agent, or Firm* — Orrick, Herrington & Sutcliffe LLP

(57) ABSTRACT

A system, device, computer-readable instructions, and method are provided for mapping and filtering of visual objects to address bump mapping. For example, a system, device, computer-readable instructions, and method are provided as a unified shading model representing both bump orientation and bidirectional radiance distribution function ("BRDF"). The computer-readable instructions are non-transitory, and storable on a storage device, including a CDROM, flashdrive, cloud, processor memory, or other storage capability.

14 Claims, 15 Drawing Sheets

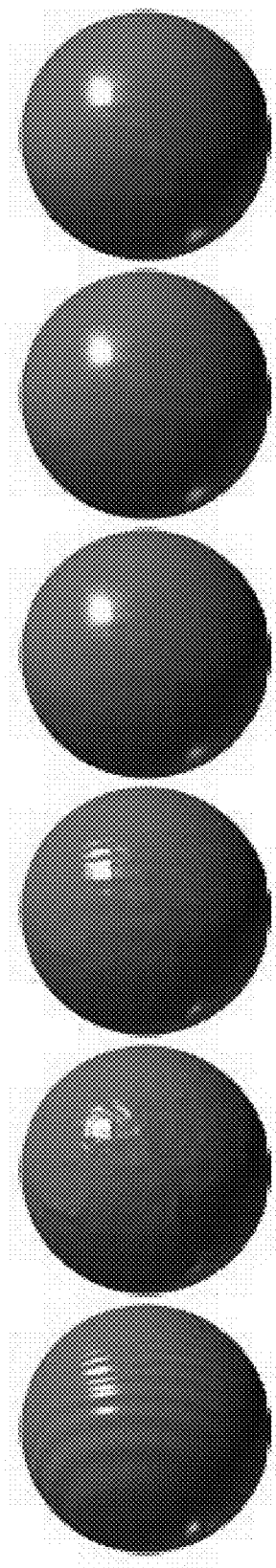

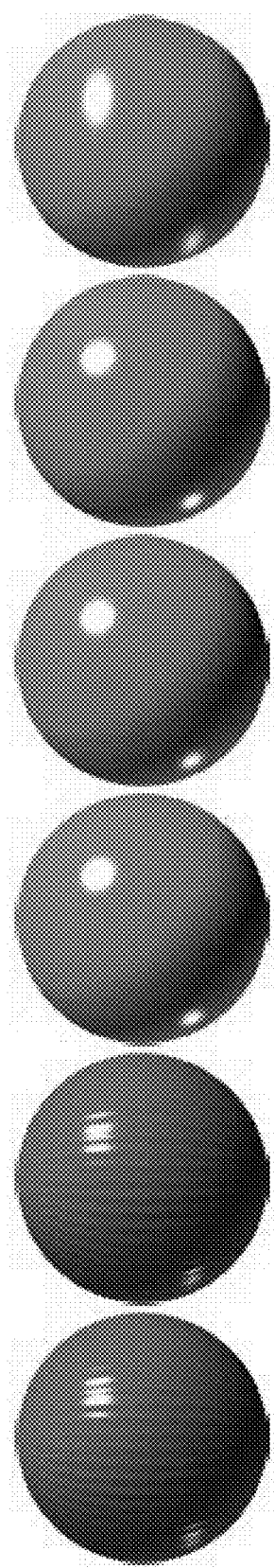

| ATI Radeon HD 5870 | Blinn-Phong | Single LEAN map | Per-frame generation | Mixture textures | Mixture approx. |
|---|---|---|---|---|---|
| | 1570 FPS | 1540 FPS | 917 FPS<br>gen: 8 ALU + 1 tex | 1450 FPS | 1458 FPS |
| D3D instructions | 30 ALU + 1 tex | 42 ALU + 2 tex | use: 42 ALU + 2 tex | 54 ALU + 5 tex | 54 ALU + 4 tex |

FIG. 12

METHOD AND SYSTEM FOR FILTERING OF VISUAL OBJECTS

CROSS-REFERENCE TO RELATED APPLICATION(S)

This application claims priority to U.S. Provisional Patent Application No. 61/444,129, filed on Feb. 18, 2011, entitled "LEAN MAPPING," which is herein incorporated by reference in its entirety.

COPYRIGHT AND LEGAL NOTICES

A portion of the disclosure of this patent document may contain material which is subject to copyright and/or trademark protection. The copyright and trademark owner to specific portions has no objection to the facsimile reproduction by anyone of the patent document or the patent disclosure, as it appears in the U.S. Patent and Trademark Office patent files and/or records, but otherwise reserves all copyrights and trademark rights whatsoever.

BACKGROUND

"Bump mapping" has been used to identify methods for adding detail to a surface. Such bump mapping has been used in the graphics design arts, including video games, and other industry areas for many years.

However, there are disadvantages with available bump mapping methods and systems, concerning filtering and anti-aliasing. For example, available methods and systems require too intensive and/or expensive precomputation to be computed during runtime, or too much of an approximation to the shading model(s). For example, when viewed at a distance, standard MIP ("multum in parvo") mapping of a bump map does not capture changes in specularity, i.e., the appearance of specular reflections of light. Such specular reflections of light is ignored by some existing methods due to the intensive computations required.

Accordingly, a need exists for a fast, compatible with existing texture filtering hardware, and minimal precomputation to handle bump shapes during runtime.

SUMMARY

Example embodiments of the present invention provide a system and method for handling texture filtering such that even extremely shiny surfaces are allowed without aliasing. Example embodiments of the present invention provide a system and method for handling texture filtering such that it is compatible with existing Blinn-Phong based lighting in order to avoid expensive and time-consuming changes to existing frame assets and/or art tools. Example embodiments of the present invention provide a system and method for combining several layers of bumps for time-varying effects, high resolution decals, and/or detailed textures.

Example embodiments of the present invention provide a method and system for bump filtering in which shiny bumps are prone to aliasing, distant bumps should change surface shading, and/or directional bumps change to anisotropic highlight. Example embodiments of the present invention provide a method and system for fast, flexible, and/or relatively inexpensive, and existing solutions for bump mapping. Example embodiments of the present invention provide a method and system for blending layers of bumps. Example embodiments of the present invention provide a method and system of a combination of some or all of the described embodiments which work with existing Blinn-Phong systems.

BRIEF DESCRIPTION OF THE DRAWINGS

FIG. 7A shows an illustration of mixing of bump layers.
FIG. 7B shows an illustration of mixing of bump layers.
FIG. 7C shows an illustration of mixing of bump layers.
FIG. 7D shows an illustration of mixing of bump layers according to an embodiment of the present invention.
FIG. 7E shows an illustration of mixing of bump layers.
FIG. 7F shows an illustration of mixing of bump layers.
FIG. 8A shows an illustration of mixing of coherent bump layers.
FIG. 8B shows an illustration of mixing of coherent bump layers.
FIG. 8C shows an illustration of mixing of coherent bump layers.
FIG. 8D shows an illustration of mixing of coherent bump layers according to an embodiment of the present invention.
FIG. 8E shows an illustration of mixing of coherent bump layers.
FIG. 8F shows an illustration of mixing of coherent bump layers.

FIG. 12 shows a performance comparison of methods according to an embodiment of the present invention.

DETAILED DESCRIPTION OF EXAMPLE EMBODIMENTS

The following description provides specific details for a thorough understanding of, and enabling description for, various embodiments of the technology. One skilled in the art will understand that the technology may be practiced without many of these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section.

In an example embodiment of the present invention, there is linear texture filtering and linear combination of layers. In an example embodiment of the present invention, there is an efficiency in that there is one extra texture access, and a relatively small number of extra instructions. In an example embodiment of the present invention, there is an anti-aliasing effected which works with hardware MIP and anisotropic filtering. In an example embodiment, there is a normal mapping procedure in which there is a height map or normal map source, and is compatible with existing Blinn-Phong assets and pipeline.

Figure 1A:
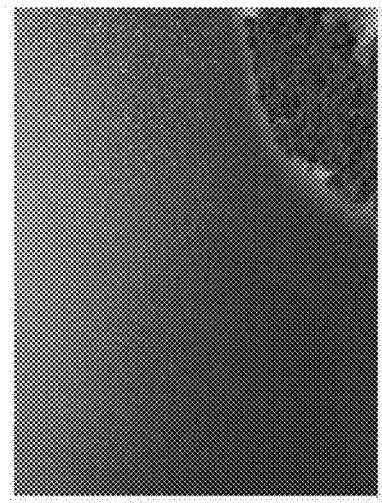
FIG. 1A shows an in-game near view according to an embodiment of the present invention.
Figure 1B:
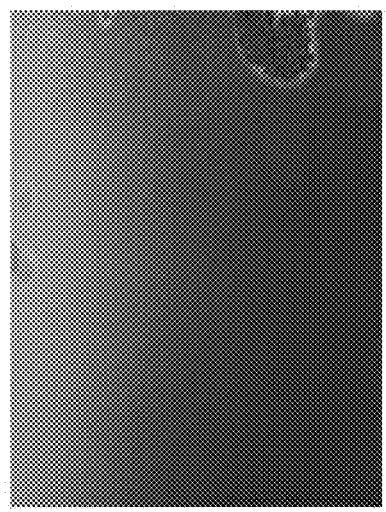
FIG. 1B shows an in-game mid view according to an embodiment of the present invention.
Figure 1C:
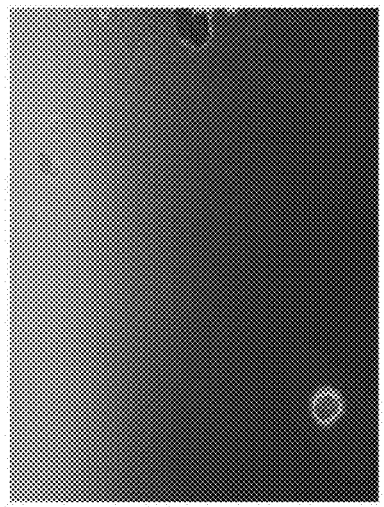
FIG. 1C shows an in-game far view according to an embodiment of the present invention.
Figure 2A:
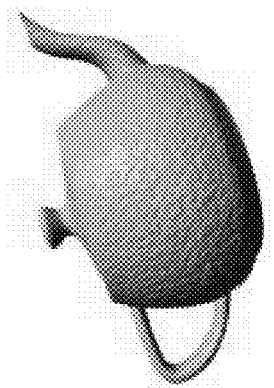
FIG. 2A shows an MIP bump map.
Figure 2B:
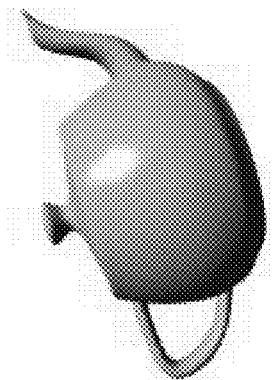
FIG. 2B shows an MIP bump map.
Figure 2C:
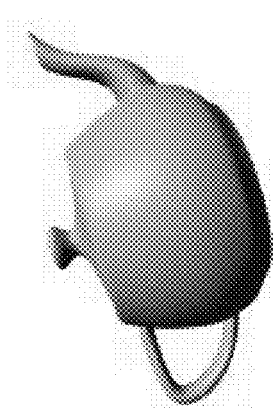
FIG. 2C shows the effect of bump mapping according to an embodiment of the present invention.
Figure 2D:
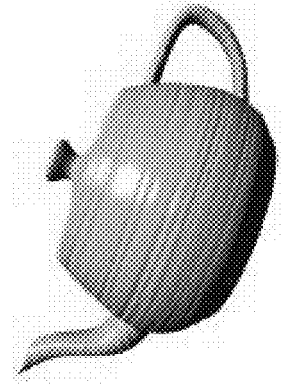
FIG. 2D shows an MIP bump map.
Figure 2E:
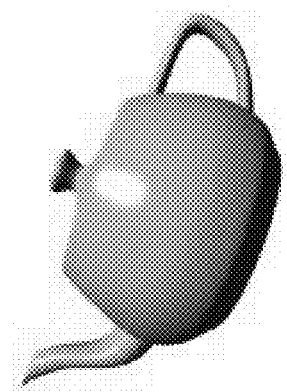
FIG. 2E shows an MIP bump map.
Figure 2F:
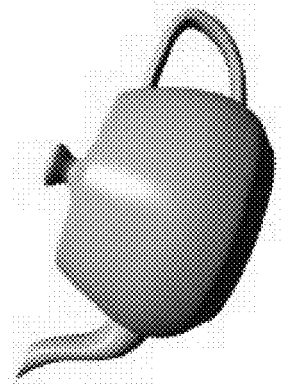
FIG. 2F shows the effect of bump mapping according to an embodiment of the present invention.

FIGS. 1A, 1B, 1C show an in-game view of a two-layer mapping according to an embodiment of the present invention. FIG. 1A shows a near view of the in-game view. FIG. 1B shows a mid-view of the in-game view. FIG. 1C shows a far view of the in-game view. The ocean itself is comprised of two bump layers moving in different directions. FIGS. 1A, 1B, 1C show the sun, i.e., main highlight, just off screen to the right. The main highlight is indicated off-screen to the right of the views. Peripheral highlights are visible as glints or spots on the water. The artist-selected base specular power is 13,777; that is, the artist-selected shininess is equivalent to a Blinn-Phong specular exponent of 13,777. In an embodiment, this base specular power is added to the covariance at run-time rather than folded directly into the mapping method and system of the present invention. In an example, the 16-bit maps according to an embodiment of the present invention are generated at load time from source height maps with render-to-texture passes using an 8-tap Sobel filter. The 8-tap Sobel filter is used to estimate the per-layer height-field gradients, in embodiments of the present invention.

Embodiments of the present invention provide a Linear Efficient Antialiased Normal (LEAN) Mapping, a method for real-time filtering of specular highlights in bump and normal maps. The method evaluates bumps as part of a shading computation in the tangent space of the polygonal surface rather than in the tangent space of the individual bumps. By operating in a common tangent space, one can store information on the distribution of bump normals in a linearly-filterable form compatible with standard MIP and anisotropic filtering hardware. The necessary textures can be computed in a preprocess or generated in real-time on the GPU for time-varying normal maps. In embodiments, the present invention effectively captures the bloom in highlight shape as bumps become too small to see, and will even transform bump ridges into anisotropic shading. Unlike even more expensive methods, several layers can be combined cheaply during surface rendering, with per-pixel blending. Though the method is based on a modified Ward shading model, one can map between its parameters and those of a standard Blinn-Phong model for compatibility with existing art assets and pipelines, and demonstrate that both models produce equivalent results at the largest MIP levels.

For over thirty years, bump mapping has been an effective method for adding apparent detail to a surface [Blinn 1978]. The term bump mapping refers to both the original height texture that defines surface normal perturbation for shading, and the more common and general normal mapping, where the texture holds the actual surface normal. These methods are extremely common in video games, where the additional surface detail allows a rich visual experience without complex high-polygon models.

Bump mapping has serious drawbacks with filtering and antialiasing. When viewed at a distance, standard MIP mapping of a bump map can work for diffuse shading, but fails to capture changes in specularity. A shiny but bumpy surface, seen far enough away that the bumps are no longer visible, should appear as if it were a duller surface, with formerly visible bumps becoming part of the surface microstructure. Bump mapping will instead produce a surface with the correct average normal but the original shininess (see FIG. 2(a-c)), which can lead to significant aliasing.

The problem is even worse for bumps with any repeated directional pattern. Bump directionality should result in anisotropic shading when the bumps are no longer individually discernible, much as with geometrically derived anisotropic shading models. Bump maps instead revert to a symmetric highlight (see FIG. 2(d-f)).

Existing approaches either require precomputation too expensive to compute on the fly, large per-texel run-time data, or significant approximations to the shading model. Many use representations that do not combine linearly, violating a core assumption of standard texture filtering. Embodiments of the present invention provide an approach that is fast, compatible with existing texture filtering hardware, and requires minimal precomputation to allow live changes to bump shapes. It should allow even extremely shiny surfaces without aliasing artifacts. As a further constraint, the method should work well with existing Blinn-Phong based lighting.

FIGS. 2A to 2F show: Comparison of traditional bump mapping and LEAN mapping. (a) Finest MIP level of 512×512 bump map. Either method works at this level. (b) Coarsest MIP level of bump map with traditional bump filtering and Blinn-Phong shading. (c) Coarsest MIP level using LEAN mapping. (d) Finest MIP level of a ridged bump map. (e) Coarsest MIP level with traditional bump filtering. (f) Coarsest MIP level with LEAN mapping.

Embodiments of the present invention provide for LEAN Mapping (Linear Efficient Antialiased Normal Mapping) as a modification of the Ward shading model that computes bump shading as off-center probability distributions in the overall surface tangent space. This combined bump and shading model uses the linear mixing property of the mean and second moment of these distributions to allow filtered recombination of bumps. In an embodiment, the new model requires just one additional MIP texture lookup per shading evaluation, and effectively captures antialiasing of highlight shape and transition of anisotropic bumps into an anisotropic highlight. Further, one can generate the necessary textures on the GPU from an existing height or normal map, requiring just one rendering pass into two texture render targets plus standard MIP level generation. In an embodiment, there are developed three methods for combining multiple filtered bump maps at render-time, with varying tradeoffs depending on the per-frame rendering budget. Embodiments of the present invention provide for a LEAN mapping as a simple model that is compatible with existing diffuse bump filtering, has low precomputation cost, low run-time cost, can be used alongside existing Blinn-Phong or Beckmann-distribution based shading models, and allows several approaches to the combination of multiple bump layers.

Figure 3:
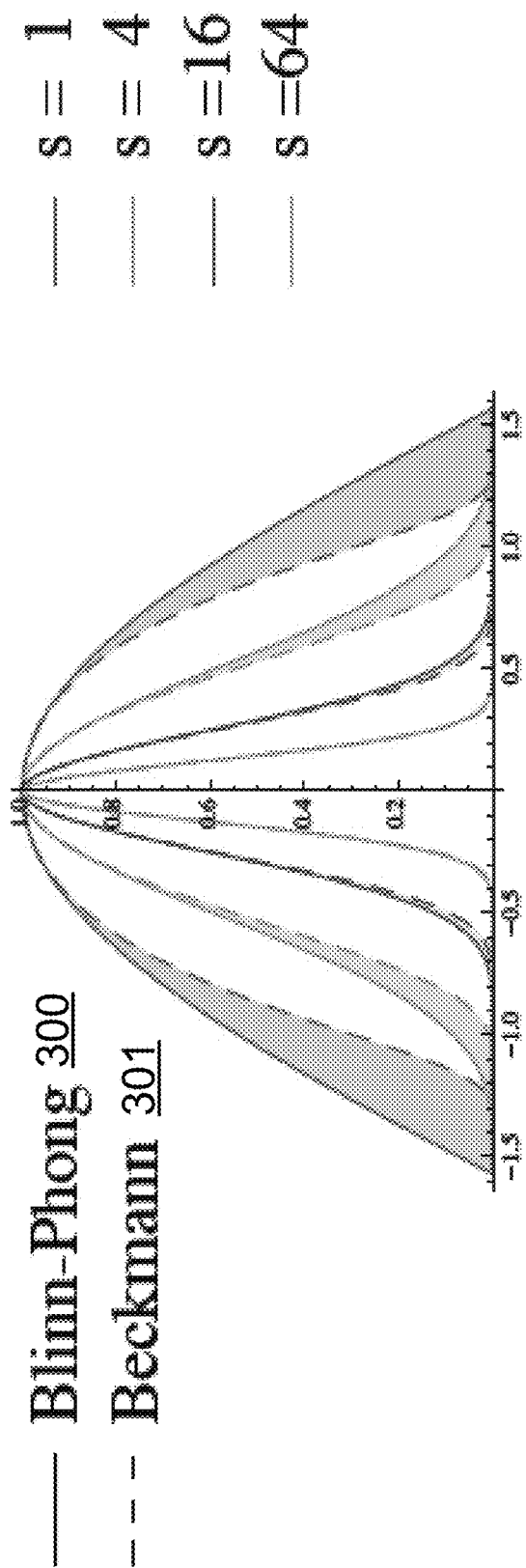
FIG. 3 shows a graphical illustration of Blinn-Phong and Beckmann methods.

The Ward model assumes perfectly reflective microfacets randomly distributed around the overall surface normal. The Beckmann distribution, a Gaussian distribution of normal slopes, is evaluated at the half vector to give the expected number of facets. FIG. 3 shows a Comparison of Blinn-Phong and Beckmann highlight shape as a function of angle (in radians). Fit improves dramatically with increasing s.

In an embodiment, to use it with existing Blinn-Phong-based game assets, we first show the equivalence of the Blinn-Phong model and a symmetric Ward model based on the Beckmann distribution. Lyon [1993] observed that Blinn-Phong approximates a Gaussian as the specular exponent s increases. From this, we observe that it also well approximates an isotropic Beckmann distribution with variance 1/s. In terms of the angle, we have $$\cos(\theta)^s \approx e^{-\frac{s}{2}\tan^2\theta}.$$

The Beckmann distribution should be normalized. The entire normalization factor for the largest MIP level could be incorporated into the specular coefficient. Instead, we include the multiplication by s in all instances of the Blinn-Phong model (but still fold the constant term into the specular coefficient). In fact, for our current game title, we were already using the s normalization of Blinn-Phong to avoid loss of apparent total brightness as the highlight tightens. FIGS. 3 (a) and (b) show that these two models produce visually equivalent results.

The Beckmann distribution is a 2D Gaussian distribution on the projection of the microfacet normals onto a plane one unit above the surface. Beckmann-based shading models use a Gaussian centered at the origin on this plane. When applied to bump maps, each bump normal defines its own tangent plane for projection. One problem for previous attempts to MIP a combined bump and specular model is the difficulty in combining these distinct planes. Previous approaches have resolved the projection problem with distributions on a sphere or by folding bump contribution into roughness at each level of the MIP pyramid. We solve it by incorporating the bump normal direction into the Beckmann shading model. We use the normal of the underlying surface as the common projection plane, and represent the specular highlight on each bump as a Gaussian centered on the bump normal's projection onto this plane (FIG. 8). Rather than use the standard Beckmann distribution $$\frac{1}{\sqrt{2\pi}|\Sigma|} e^{-\frac{1}{2}\tilde{h}_b^T \Sigma^{-1} \tilde{h}_b},$$

We use $$\frac{1}{\sqrt{2\pi}|\Sigma|} e^{-\frac{1}{2}(\tilde{h}_n - \tilde{b}_n)^T \Sigma^{-1}(\tilde{h}_n - \tilde{b}_n)}.$$

Figure 4B:
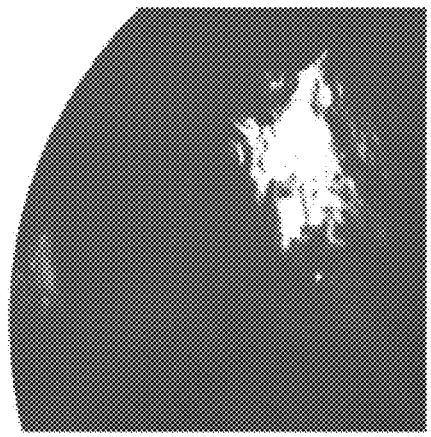
FIG. 4B shows an illustration of a shading model.
Figure 4D:
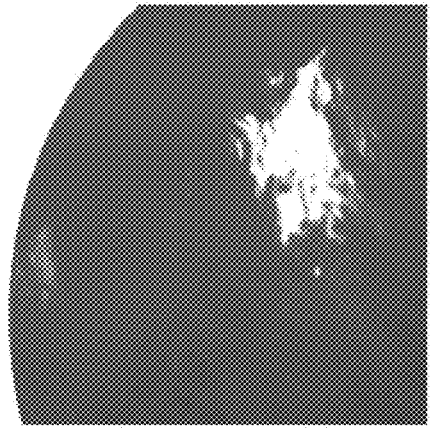
FIG. 4D shows an illustration of a shading model according to an embodiment of the present invention.
Figure 4A:
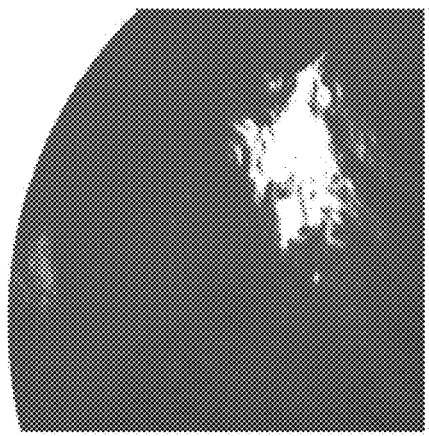
FIG. 4A shows an illustration of a shading model.
Figure 4C:
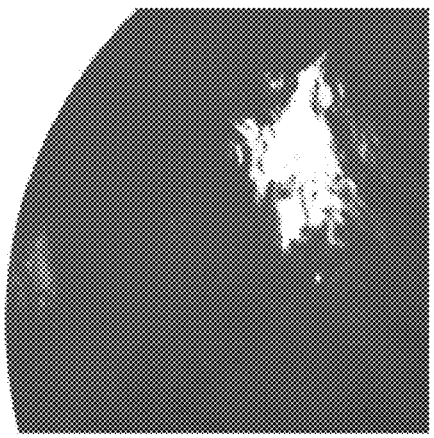
FIG. 4C shows an illustration of a shading model.

The variables used throughout the Specification are defined as follows:
$\vec{v}$ arbitrary vector
$\vec{v}.xy$, $\vec{v}.z$ subsets of components of $\vec{v}$
$\hat{v}$ $\vec{v}$ normalized to unit length
$\tilde{v}$ $\vec{v}$ projected onto its z=1 plane: $\vec{v}.xy/\vec{v}.z$
$\vec{v}_n$ $\vec{v}$ in a space with the z axis aligned with $\vec{n}$
$\vec{n}$ base surface normal
$\vec{b}$ bump normal
$\vec{v}$ vector from surface toward viewer
$\vec{l}$ vector from surface toward light
$\vec{h}$ vector half way between $\vec{v}$ and $\vec{l}$: $(\hat{v}+\hat{l})$
s Blinn-Phong specular exponent
Σ 2D covariance matrix FIG. 4c shows that this model is visually equivalent to the standard Blinn-Phong and Beckmann models. FIG. 4 shows visual equivalence of shading models at a scale that avoids filtering, showing a sphere with both a frontal and glancing highlight: (a) Blinn-Phong applied to bump normal; (b) Beckmann in the bump tangent frame; (c) Beckmann in the surface tangent frame with bumps as off-center distributions; (d) LEAN mapping, mathematically equivalent to (c) at this scale.

Figure 5:
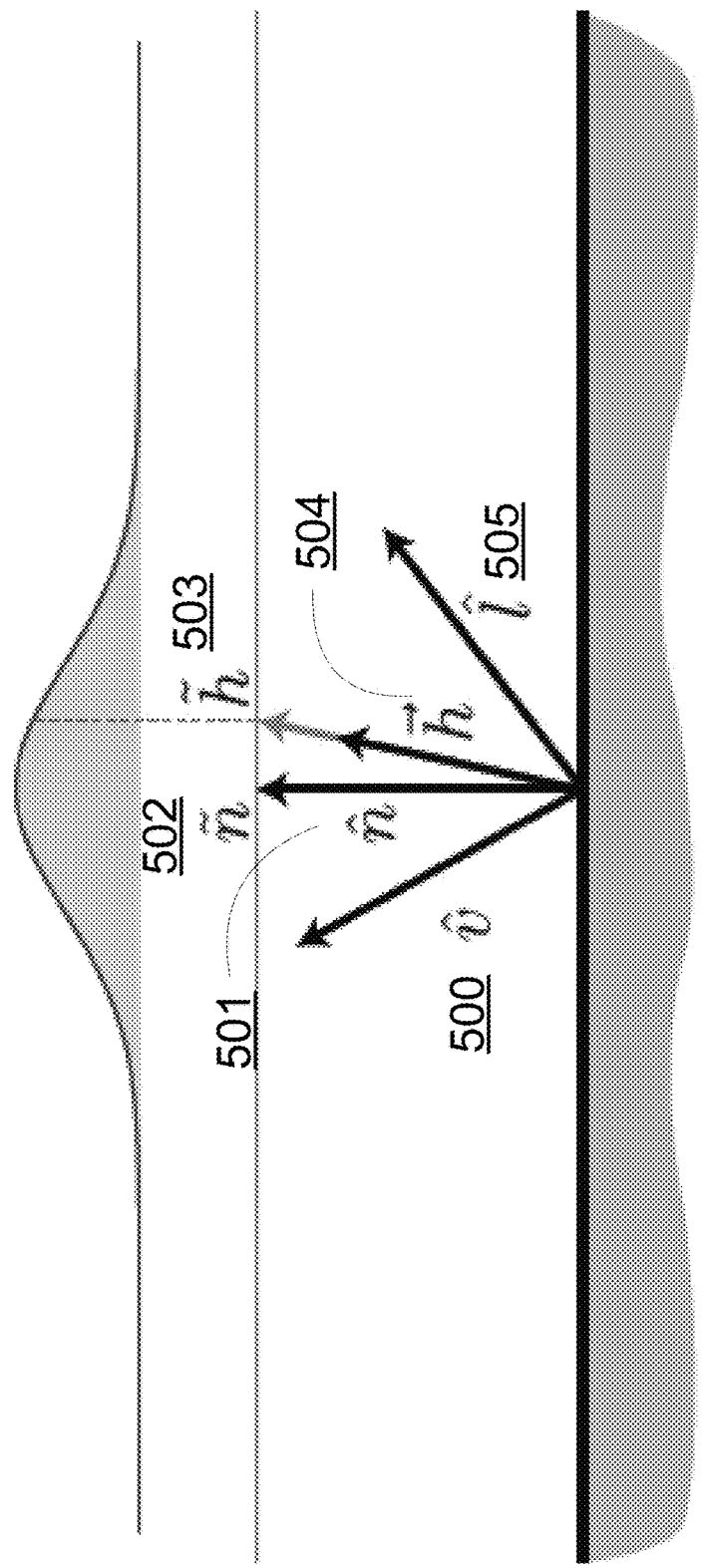
FIG. 5 shows an illustration of a Beckmann distribution-based lighting model.

FIG. 5 shows a two-dimensional (2D) illustration 500-501-502-503-504-505 of a Beckmann distribution-based lighting model.

In an embodiment, once we represent the microfacet distribution of each bump in a common plane, combining bumps from two texels into a new collective distribution is straightforward. Assume two texture samples in the MIP ("multum in parvo," i.e., many things in small place) map have mean bump directions $\bar{b}$ and $\bar{b}'$. If each is an average of n base-map normals, we have $$\bar{b} = \frac{1}{n}\sum_{1}^{n} \tilde{b}_i; \; \bar{b}' = \frac{1}{n}\sum_{n+1}^{2n} \tilde{b}_i.$$

Combining these two to get a new mean bump direction over the joint 2n base-map normals, we have $$\frac{1}{2n}\sum_{1}^{2n} \tilde{b}_i = \frac{1}{2}\bar{b} + \frac{1}{2}\bar{b}'.$$

Figure 6A:
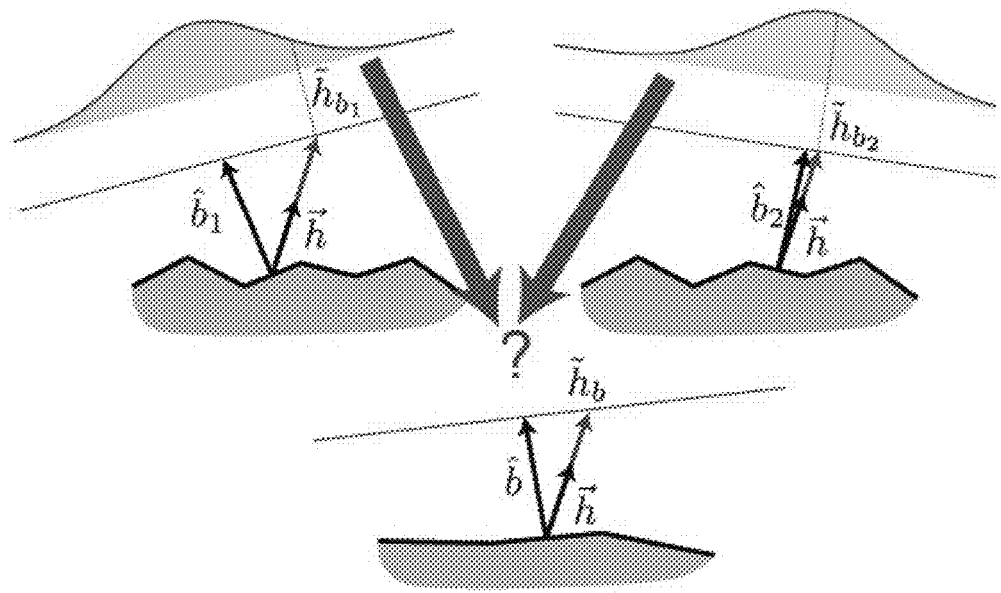
FIG. 6A shows a graphical illustration of combining surface shading.
Figure 6B:
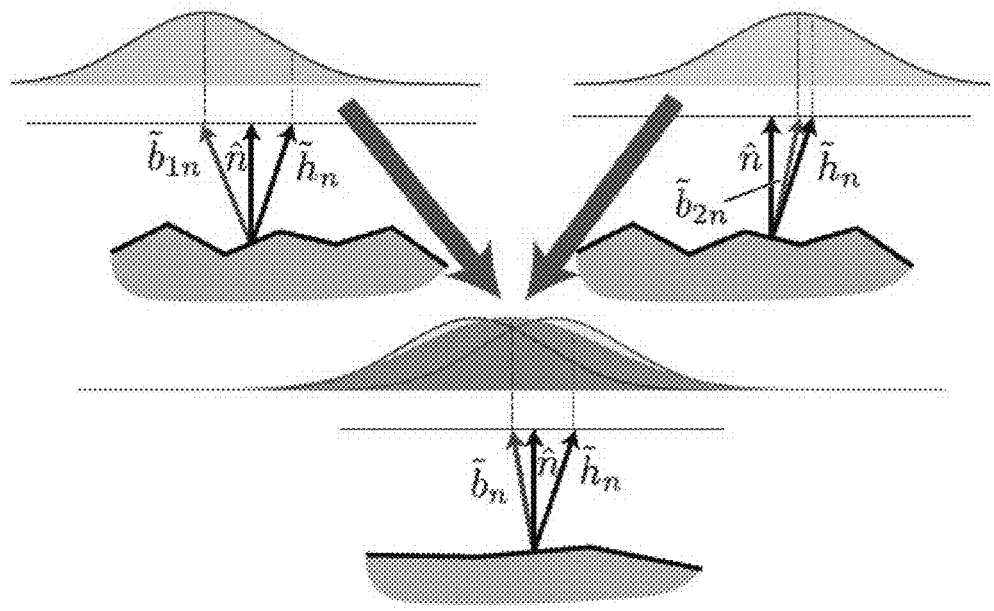
FIG. 6B shows a graphical illustration of combining surface shading according to an embodiment of the present invention.

FIG. 6A shows a problem combining surface shading from distinct bumps. Each bump defines its own tangent plane, so combining shading contributions into a new plane is not well defined. FIG. 6 B shows a new shading model incorporating bump direction as off-center Beckmann distributions in the surface tangent plane.

The projected bump directions combine linearly, so any standard linear filtering kernel can be used to find the average bump normal at the center of a new microfacet distribution. This is true if we use box filtering, summed area tables [Crow 1984], elliptically weighted averaging [Heckbert 1989], Feline [McCormack et al. 1999], or any other linear filtering method. In particular, standard MIP level generation and hardware trilinear MIP or anisotropic texture lookups will all work.

This gives the highlight center, but does not affect its size or shape, which is controlled by the covariance matrix Σ

$$\sum \begin{bmatrix} \left(\frac{1}{n}\Sigma \vec{b} \cdot x^2\right) - \vec{b} \cdot x^2 & \left(\frac{1}{n}\Sigma \vec{b} \cdot x\vec{b} \cdot y\right) - \vec{b} \cdot x\vec{b} \cdot y \\ \left(\frac{1}{n}\Sigma \vec{b} \cdot x\vec{b} \cdot y\right) - \vec{b} \cdot x\vec{b} \cdot y & \left(\frac{1}{n}\Sigma \vec{b} \cdot y^2\right) - \vec{b} \cdot y^2 \end{bmatrix}$$

Schilling [1997] also used a covariance matrix based model, but stored an upper-triangular decomposition of the matrix. Neither the covariance matrix, nor upper-triangular decomposition combine linearly, but the second moments do, and can be used to reconstruct the elements of Equation:

$$\frac{1}{n}\sum_1^n \vec{b} \cdot x^2; \frac{1}{n}\sum_1^n \vec{b} \cdot x\vec{b} \cdot y; \frac{1}{n}\sum_1^n \vec{b} \cdot y^2.$$

Since these take the same sum-over-microfacets form, they can also be stored in a texture and combined with any linear filter kernel. This combination of bump covariances in a common space are the key to transitioning large scale bump behavior into microfacet shading behavior.

To summarize, given a bump normal, $$N=(\vec{b}_n x, \vec{b}_n y, \vec{b}_n z),$$

the top level of a LEAN map texture is seeded with $$B=(\tilde{b}_n x, \tilde{b}_n y)$$

$$M=(\tilde{b}_n x^2, \tilde{b}_n x\ \tilde{b}_n y, \tilde{b}_n y^2).$$

Standard filtered texture sampling of these five values will give an antialiased and filtered blend of bumps and specular shading for any view. We can reconstruct the bump normal for diffuse shading. To save computation and improve the quality of the diffuse filtering, we can instead store the bump normal, N, directly in the three empty texture slots (assuming two four-element textures). This also allows diffuse filtering using the un-normalized normal after texture filtering.

Any method can generate MIP levels (e.g. the driver's MIP filter chain), either as a preprocess or pre-frame texture generation. During shading, trilinear or anisotropic sampling computes the correct filtering. Given filtered texture values, B and M (from maps seeded according to Equations ((3) and (4)), we reconstruct Σ

$$\Sigma = \begin{bmatrix} M \cdot x - B \cdot x * B \cdot x & M \cdot y - B \cdot x * B \cdot y \\ M \cdot y - B \cdot x * B \cdot y & M \cdot z - B \cdot y * B \cdot y \end{bmatrix},$$

As with microfacet shading models, the previous section assumes the top level of the bump map consists of perfect mirror reflectors. This may be acceptable for environment mapping perfectly shiny surfaces, but generally we have surfaces with some base roughness. Han et al. [2007] show that an existing BRDF can be combined with a normal distribution by convolution. Intuitively, each facet of the normal distribution contributes its underlying BRDG kernel to the whole combined distribution. Han et al. use frequency space for this convolution. Fortunately, the Fourier transform of a Gaussian is another Gaussian with the inverse variance. Thus (ignoring normalization factors here for compactness) the convolution of a normal distribution with covariance Σ and shading with Blinn-Phong exponent s is $$e^{-\frac{1}{2}(\tilde{h}_n - \tilde{b}_n)^T \Sigma^{-1}(\tilde{h}_n - \tilde{b}_n)} \otimes e^{-\frac{s}{2}(\tilde{h}_n - \tilde{b}_n)^T(\tilde{h}_n - \tilde{b}_n)}.$$

In frequency space this becomes $$e^{-\frac{1}{2}(\tilde{h}_n - \tilde{b}_n)^T \Sigma(\tilde{h}_n - \tilde{b}_n)} e^{-\frac{1}{2s}(\tilde{h}_n - \tilde{b}_n)^T(\tilde{h}_n - \tilde{b}_n)} = e^{-\frac{1}{2}(\tilde{h}_n - \tilde{b}_n)^T(\Sigma + \frac{1}{s}I)(\tilde{h}_n - \tilde{b}_n)}.$$

We can compute the results of the convolution by just adding 1/s to the $x^2$ and $y^2$ terms of the Σ when computing M $$M=(\tilde{b} \cdot x^2 + 1/s, \tilde{b}_n x \tilde{b}_n y, \tilde{b}_n y^2 + 1/s).$$

In an embodiment, this has the effect of baking the Blinn-Phong specularity into the texture. FIG. 4(d) shows that this is visually equivalent to the Blinn-Phong model. Alternately, we can add 1/s during final shading, when reconstructing Σ by Equation (5)

Figure 11B:
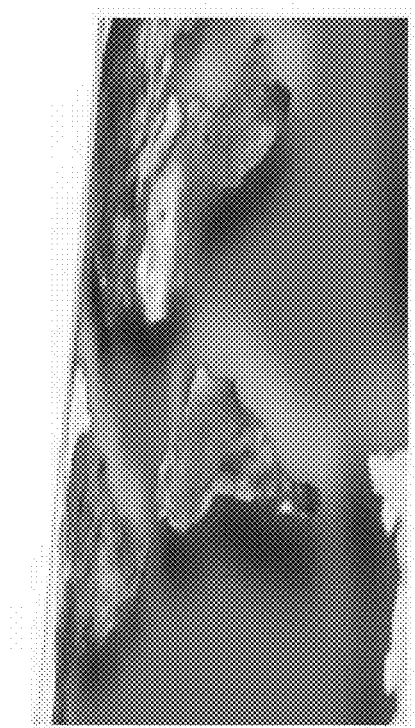
FIG. 11B shows an illustration of an ocean current simulation.
Figure 11A:
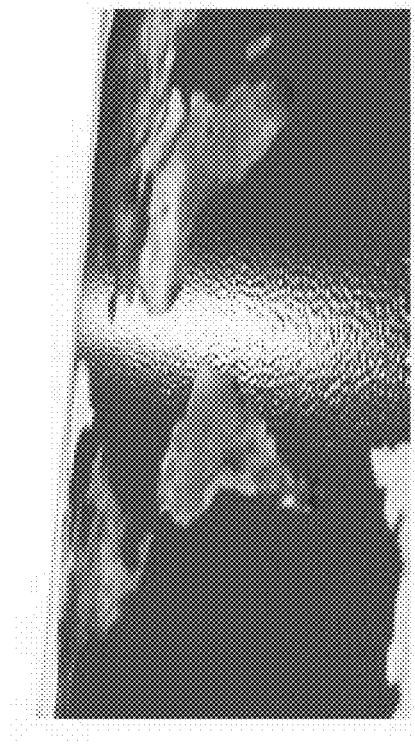
FIG. 11A shows an illustration of an ocean current simulation.

FIG. 11 shows ocean current simulation combining four moving layers of Gabor noise [Lagae et al. 2009]: (a) Still shot of the water. Ocean waves follow a clockwise flow around the Atlantic, with stable antialiasing as we zoom in and out; (b) Flow map used to weight moving water layers, computer as the curl of a distance map from the continents. Red and green channels give a flow vector, and layers are weighted in proportion to their movement direction.

In some cases, we want to combine multiple layers of bumps, either as an overlayed bump decal, or to support some moving bump element (ocean waves, shock waves, impact effects, etc.). Since the texture data is fast enough to create per frame, most situations where multiple layers of bumps are combined can just do so at the texture generation time (FIG. 7(d),8(d)).

However, there are some cases when it is preferable to combine layers of bumps at render time. For example, we can create an ocean water surface with several layers of wave bumps moving in different directions. The entire ocean is too big to create a single texture at sufficient resolution to resolve the waves, but we can repeat a smaller wave texture across the surface and use a lower-resolution full ocean current texture to guide the mixing of layers. This allows global ocean currents (FIG. 11), and helps disguise any texture repeat artifacts with differing mixing ratios (FIG. 1).

Given bumps defined by a height field, f(x,y), we can directly compute the projected bump normal, bf [Blinn 1978]:

$$\vec{bf} = \left(-\frac{\partial f}{\partial x}, \frac{\partial f}{\partial y}\right).$$

For a linear combination of two height fields, f(x,y) and g(x,y) according to barycentric weights t and u, t+u=1, this becomes:

$$\tilde{b} = \left(-\frac{\partial(tf+ug)}{\partial x}, -\frac{\partial(tf+ug)}{\partial y}\right)$$
$$= t\tilde{b}\tilde{f} + u\tilde{b}g$$

So to find b for a mix of height fields we just mix the projected normals. Since we don't need the height field for the mixing, we can use the mixing, we can use the same mixture model for bumps given as normal maps. Either from original height fields or mixed normal maps, the mixing of second moments is slightly more complex. The second moments are $$\tilde{b} \cdot x^2 = (t\tilde{b}\tilde{f} \cdot x + u\tilde{b}g \cdot x)^2$$
$$= t^2(\tilde{b}\tilde{f} \cdot x)^2 + u^2(\tilde{b}g \cdot x)^2 + 2tu(\tilde{b}\tilde{f} \cdot x\tilde{b}g \cdot x)$$

$$\tilde{b} \cdot y^2 = (t\tilde{b}\tilde{f} \cdot y + u\tilde{b}g \cdot y)^2$$
$$= t^2(\tilde{b}\tilde{f} \cdot y)^2 + u^2(\tilde{b}g \cdot y)^2 + 2tu(\tilde{b}\tilde{f} \cdot y\tilde{b}g \cdot y)$$

$$\tilde{b} \cdot x\tilde{b} \cdot y = (t\tilde{b}\tilde{f} \cdot x + u\tilde{b}g \cdot x)(t\tilde{b}\tilde{f} \cdot y + u\tilde{b}g \cdot y)$$
$$= t^2(\tilde{b}\tilde{f} \cdot x\tilde{b}\tilde{f} \cdot y) + u^2(\tilde{b}g \cdot x\tilde{b}g \cdot y) +$$
$$tu(\tilde{b}\tilde{f} \cdot x\tilde{b}g \cdot y) + tu(\tilde{b}g \cdot x\tilde{b}\tilde{f} \cdot y),$$

The terms in the Equations are dependent on f or g alone, and are already stored as part of the standard LEAN map. The red terms involve both f and g, for a total of four extra fg cross terms. Note that these are independent of the mixing ratio between f and g. They can be computed and stored in a third texture, and just multiplied by the appropriate t u factor for rendering (FIG. 7(e),8(e)). If the layers are moving relative to each other, the mixing textures will need to be recomputed each frame, but the mixing factors can be varied per pixel during rendering. For more layers, it is necessary to create these mixing textures for all pairwise combinations of the base layers so while two layers need one mixing texture, three would require three mixing textures, four would need six, etc.

Rather than create and store all of these mixing textures we can approximate them from the components of the f and g's B textures at rendering time. This has the advantage of not requiring any additional textures or texture lookups, and eliminating all need for per-frame texture construction (FIG. 7F). It will, however, produce incorrect results if the layers are coherent and reinforce or cancel each other enough to affect the overall filtered bump shading. For example if f is a set of ridges and g=1-f, an equal mixing of both should reduce to a smooth surface. Using this approximation, the near view will still be correct. However, the distant shading will be anisotropic, since the mixing approximation cannot distinguish a mixing of two coherent anisotropic bump textures that reinforce each other from a mixture that cancel each other out (FIG. 8F).

This can be a problem for highly correlated bump fields. In our applications, the cross terms are nowhere near as coherent, nor as stable and we are able to use the mixing approximation with no visible artifacts.

These three solutions cover most bump layer mixing situations. Direct computation during LEAN map generation has the least run-time overhead, but requires either static maps or per-frame map generation, and needs sufficient LEAN map resolution (somewhat defeating the purpose of detail textures or high-resolution decals). Mixing textures allow per-pixel run-time remixing of textures, but also need a LEAN map resolution sufficient to cover the mix of all source bump maps. Finally the mixing approximation does not need any additional data, even when mixing LEAN maps of differing resolutions, but can occasionally suffer artifacts, most commonly seen if using the same map (or its inverse) for more than one layer.

LEAN maps work well on a mix of hardware and software. We have run versions of the LEAN map on a wide variety of platforms, including an Apple MacBook Pro with OpenGL on an NVIDIA 9600M GT, Windows Vista 64-bit with DirectX 11 on an AMD Radeon 5870, and DiorectX 9 on a range of NVIDIA and ATI cards. FIG. 12 shows some performance data. We compare regular Blinn-Phong bump mapping, LEAN mapping with a single precomputed LEAN map layer, LEAN mapping with the map textures generated each frame with automatic MIP generation, a mix of two layers using the mixture approximation. In all cases, the shaders included ambient and diffuse terms (but no diffuse color texture), and a Fresnel modulation of the specular terms using the Schlick [1993] approximation. Frame rates were recorded at 1600×1200 with a single object filling the entire screen. Our frame rates of almost 1000 frames per second to over 1500 FPS on modern hardware clearly show that this is an efficient method, but since it is just one part of a game shader, frame rates are not too indicative of total performance.

FIG. 7 shows a mixing of bump layers. (a,b) Each bump layer alone; © equal mixture of a and b at the finest MIP level; (d-f) comparison at a coarser MIP level (using MIP bias to emphasize differences): (d) mixed as height fields when generating a single LEAN map; (e) using mixture textures; (f) using mixture approximation. The mixture approximation works well when the layers are not coherent.

FIG. 8 shows a mixing of coherent bump layers, (sin x) and (−sin x): (a,b) Each bump layer alone; (c) equal mixture of a and b at the finest MIP level: bumps cancel out to a smooth surface; (d-f) comparison at the coarsest MIP level (using MIP bias to emphasize differences): (d) mixed as height fields when generating a single LEAN map; (e) using mixture textures; (f) using mixture approximation. The mixture approximation gets an elongated highlight from the anisotropy of the underlying layers.

Figure 9:
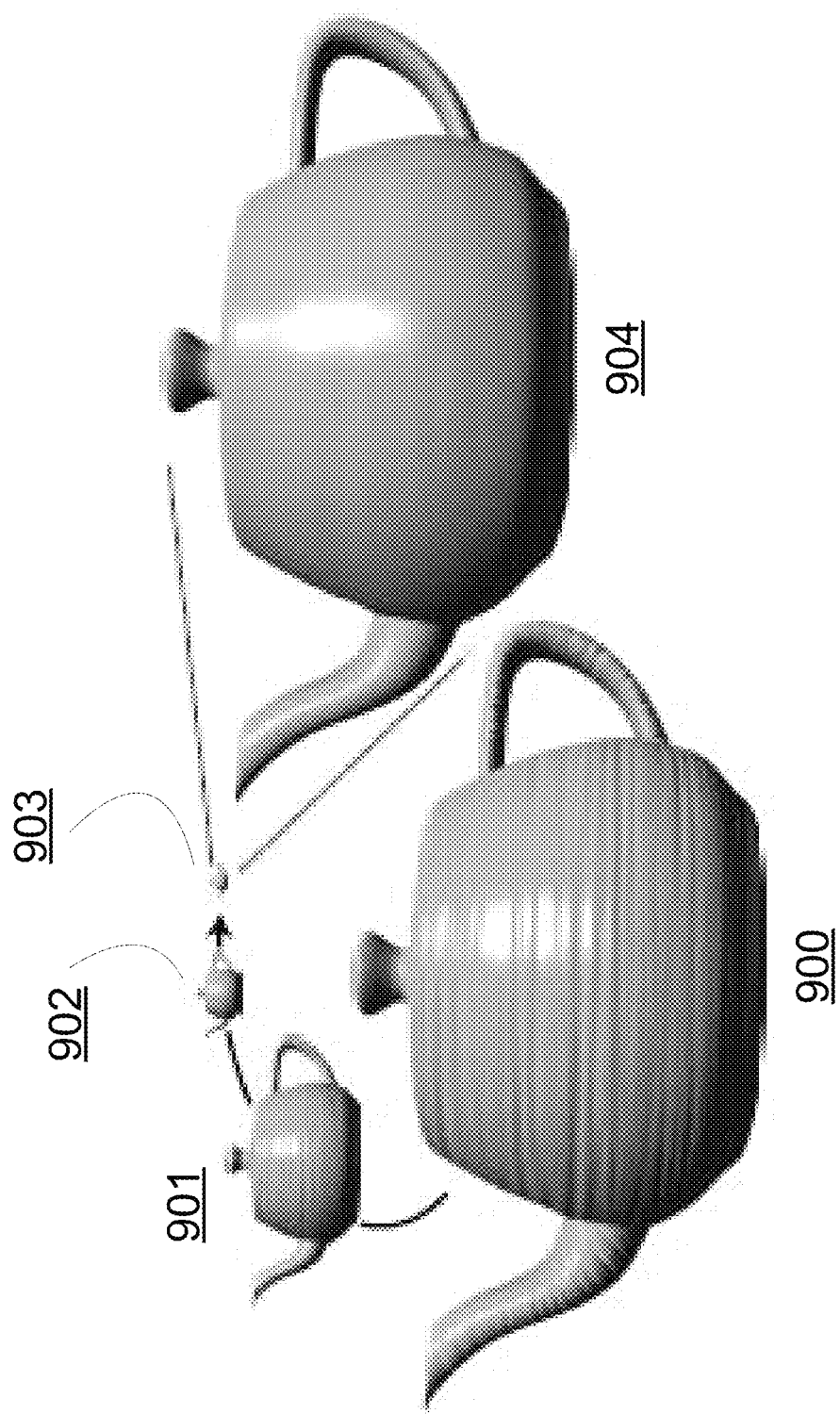
FIG. 9 shows an illustration of an anisotropic bump pattern according to an embodiment of the present invention.
Figure 10A:
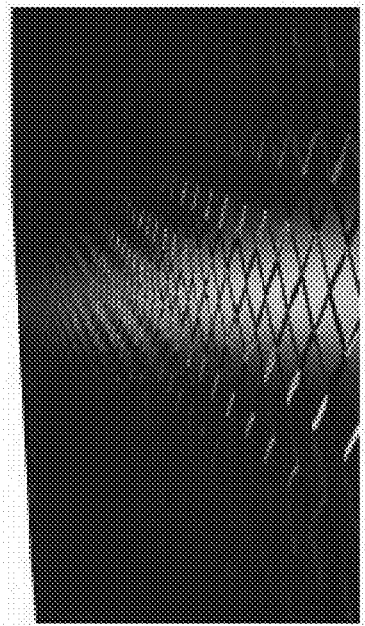
FIG. 10A shows an illustration of bump antialiasing on a raised checker grid.
Figure 10B:
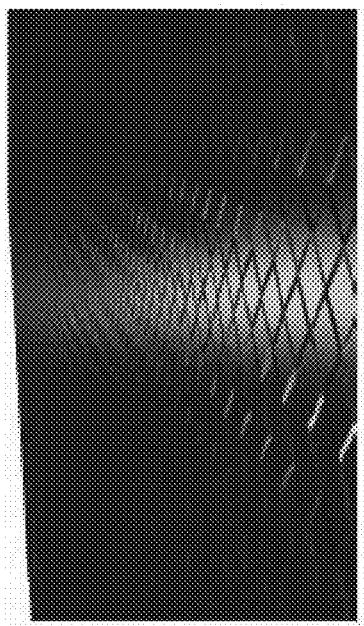
FIG. 10B shows an illustration of bump antialiasing on a raised checker grid.
Figure 10C:
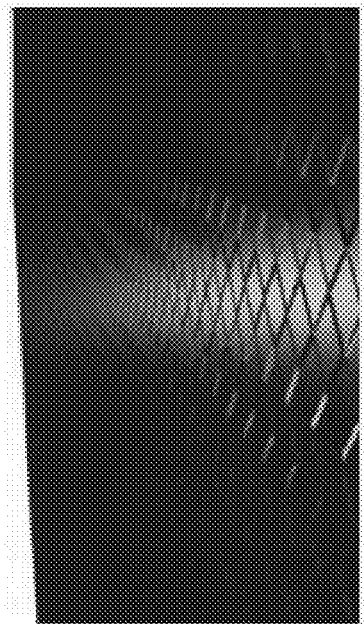
FIG. 10C shows an illustration of bump antialiasing on a raised checker grid according to an embodiment of the present invention.
Figure 10D:
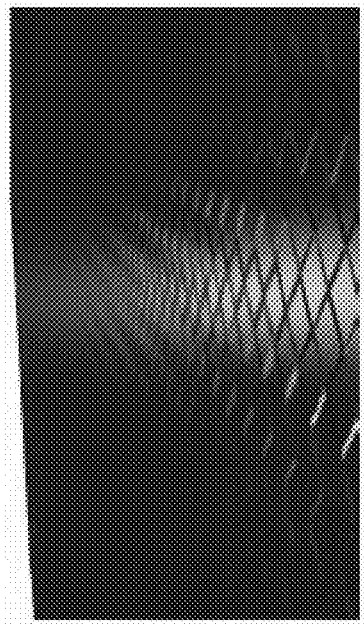
FIG. 10D shows an illustration of bump antialiasing on a raised checker grid according to an embodiment of the present invention.

FIG. 9 shows an anisotropic bump pattern as a model 900-901-902-903-904 moves away. All images in this paper have an isotropic base roughness, with specular exponents ranging 128 to about 14,000. Any shading anisotropy is derived from the bumps themselves. FIG. 2(d-f) show an isotropic bump distribution turning into a more diffuse highlight. FIG. 2(a-c) show the same model with an anisotropic bump pattern. FIG. 9 shows the same bump pattern at natural scale, showing antialiasing and filtering.

FIG. 10 shows antialiasing of a raised checker pattern. Notice the significant distance aliasing in the unfiltered version. In the trilinear MIP-filtered version, the aliasing is gone, and there is some checker-aligned distant highlight spread, but the elongated main highlight diffuses out a little early. The anisotropic-filtered version fixes the over-blurring of the main highlight while retaining the other filtering advantages.

FIG. 10 shows a two-layer LEAN map ocean in a game currently under development. The ocean consists of two bump layers moving in different directions. The main highlight is just off-screen to the right, but peripheral highlights, are visible as glints on the water. The artist-selected base specular power is 13,777, added to the covariance at runtime rather than folded directly into the LEAN map. The 16-bit LEAN maps are generated at load time from source height-maps with render-to-texture passes using an 8-tap Sobel filter to estimate the per-layer height-field gradients.

FIG. 12 shows a performance comparison. Frames per second were recorded at 1600×1200 full screen with all pixels covered. Instruction counts are as reported by the Direct3D HLSL compiler with the pixel shader 3.0 profile.

Figure 13:
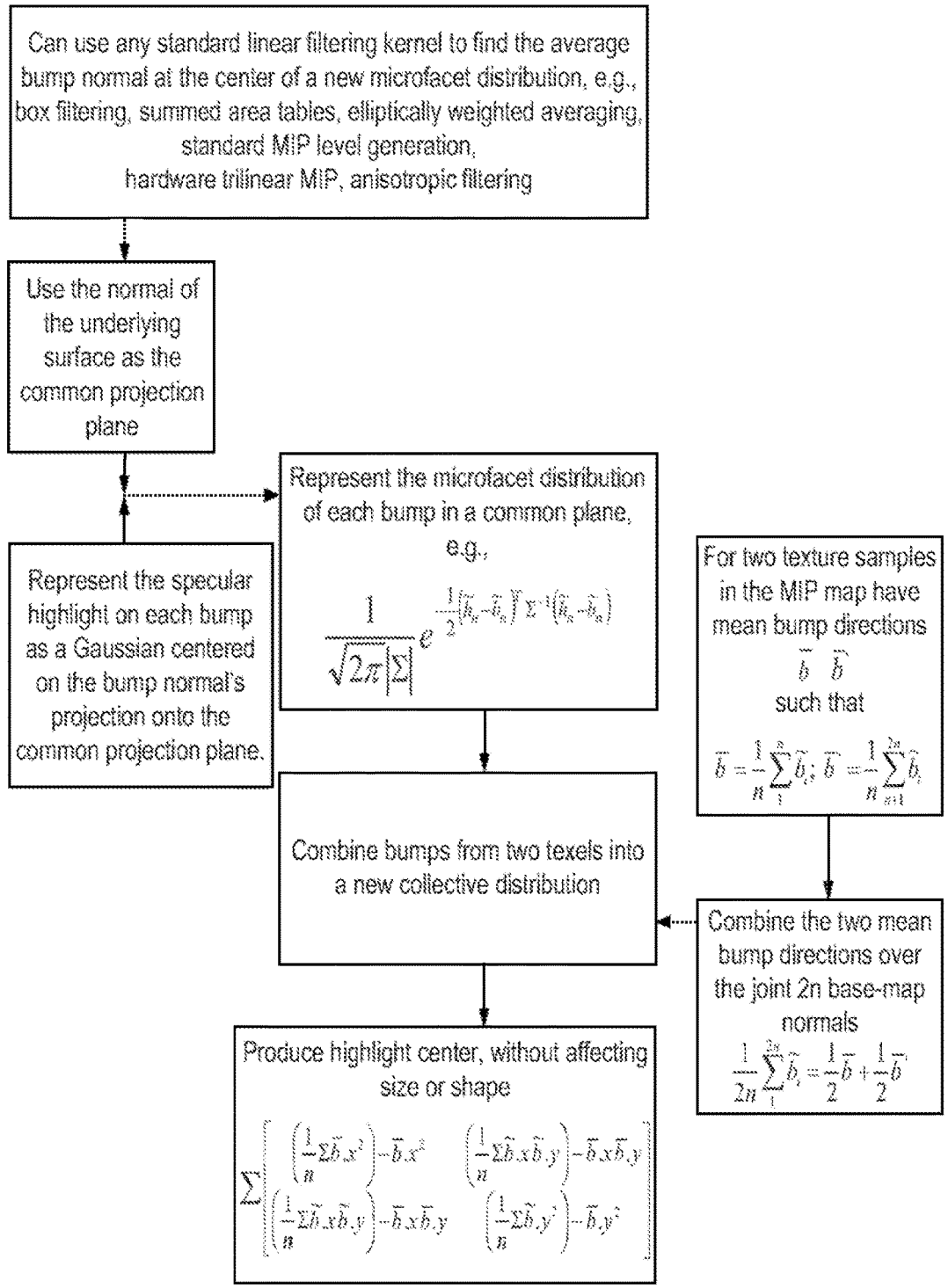
FIG. 13 shows an embodiment of the present invention.
Figure 14:
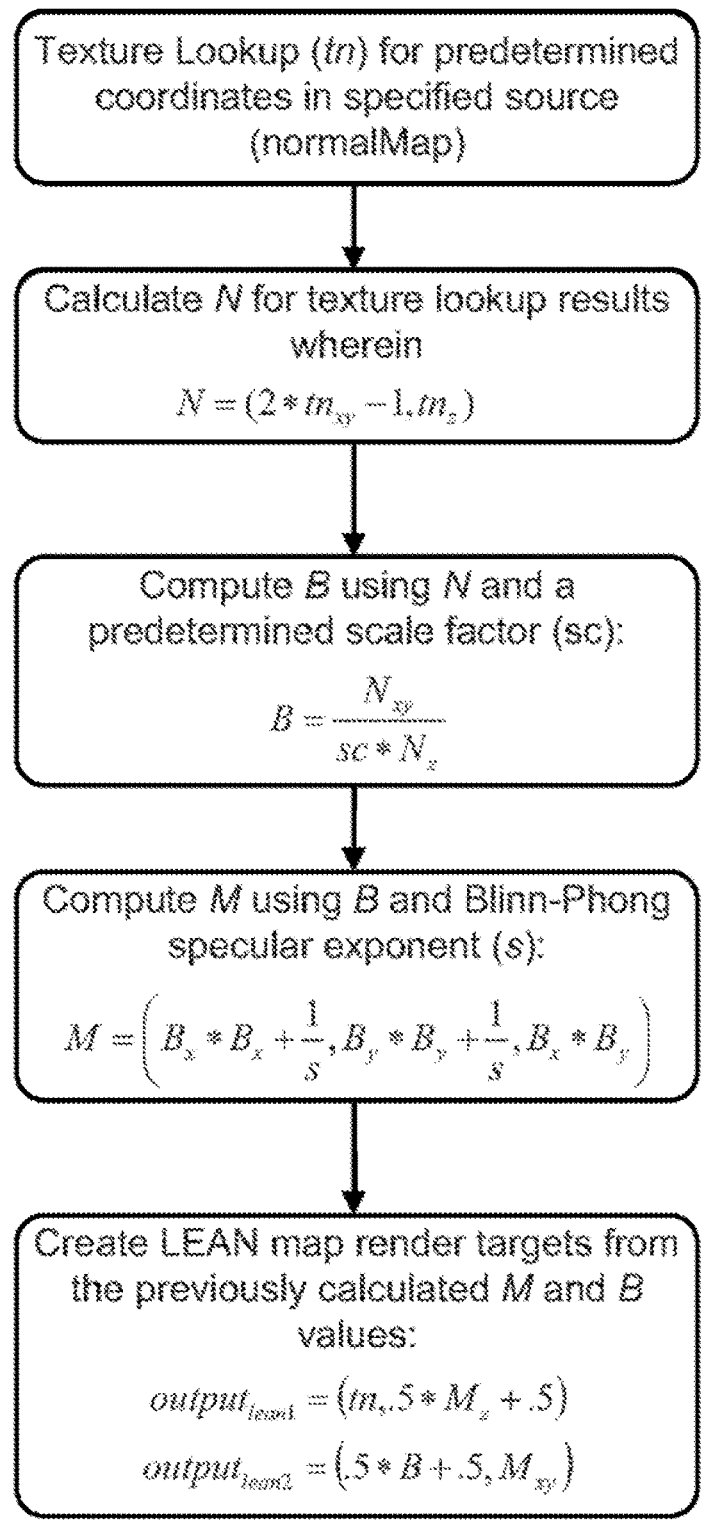
FIG. 14 shows an embodiment of the present invention.
Figure 15:
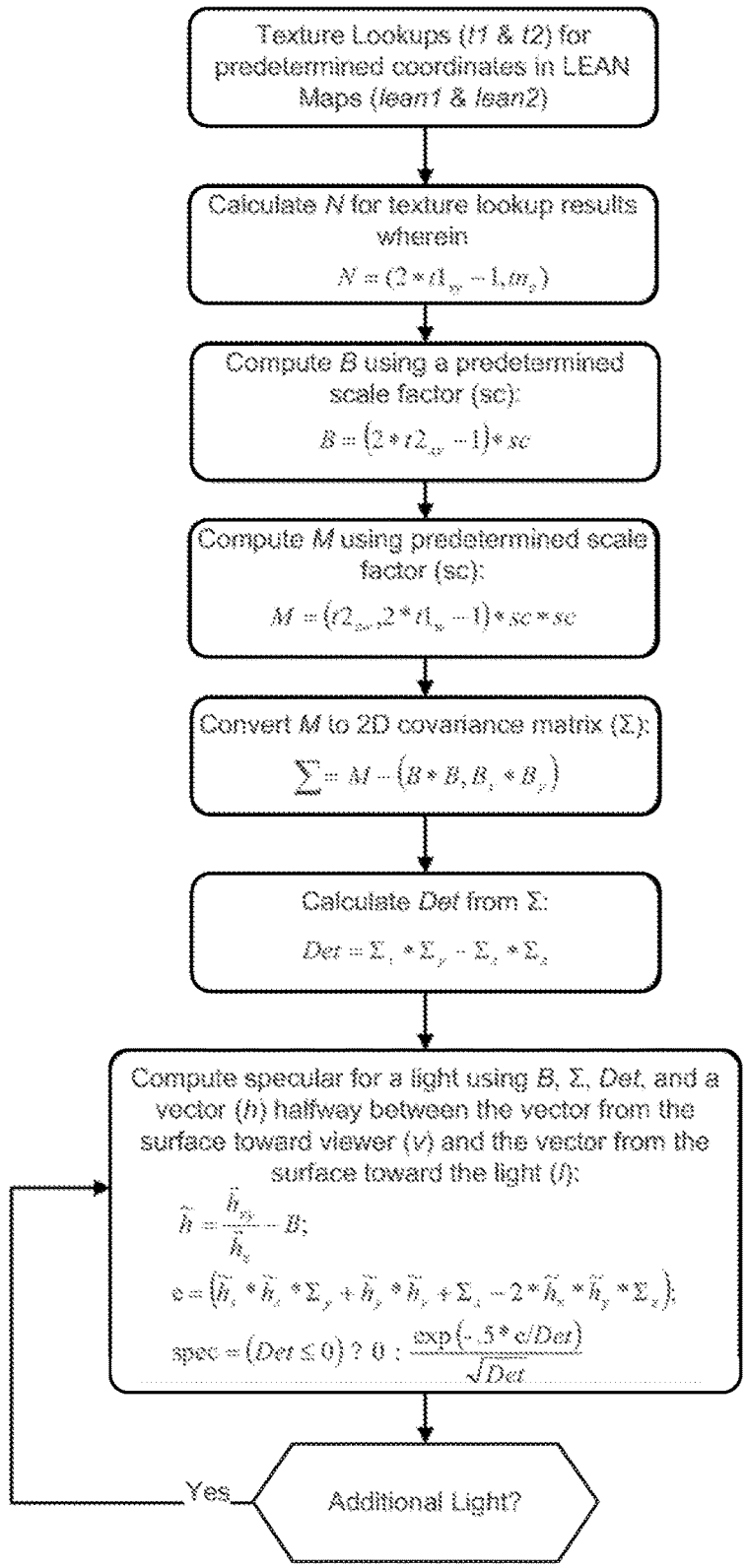
FIG. 15 shows an embodiment of the present invention.

FIGS. 13, 14, and 15 illustrate embodiments of the present invention via flowcharts.

A code fragment is provided to render top-level LEAN map textures from an existing normal map. It shows a code fragment to generate a LEAN map from a source normal map. The code includes a scale factor that can be used to avoid overflow and loss of precision. It should be chosen so B will fill, but not overflow, the −1 to 1 range. For 8-bit texture components, the choice of scale factor is critical to avoid numerical problems, but for 16-bit it is sufficient to just choose a factor that avoids texture overflow. This code fragment is most of the complete shader, missing only input and output declarations and function declaration. This code is used on a quad to generates two texture render targets that are the top level of the LEAN map. After running this pass, either a standard user or driver-provided MIP generation fills in the remaining levels of the maps.

A run-time LEAN mapping pseudo-code fragment in block form. It shows a code fragment to use the resulting LEAN maps. This code uses mathematical symbols to match notation from FIG. 3, but otherwise is stock HLSL. The code fragment shown only computes the specular term for one light. Additional lights would just repeat the final three lines of the fragment. In use, this fragment should to be combined with base surface color textures, diffuse shading and a Fresnel term.

Like other Beckmann distribution-based shading models, in an embodiment, LEAN mapping can only capture one direction of anisotropy. It cannot capture the bi-modal distribution of a set of sharp V groves, or the two principal directions of anisotropy aligned with the threads of woven materials like particularly shiny cloth. For such models, a method like Frequency Domain Normal Map Filtering might be better suited [Han et al. 2007]. We find this limitation acceptable in exchange for the speed and simplicity of LEAN mapping, the large variety of materials it does support, and the compatibility with the existing art pipeline.

None of the options for combining bump layers is ideal, though the three methods we present together handle most cases. For fastest operation when the layers' bumps are not highly correlated with each other, the mixing approximation works well. For layers, including coherent layers, that do not move relative to each other but may have changing per-pixel mixing ratios, the mixing textures work well. Neither of these options need to update the LEAN maps every frame, so maps can be generated in a preprocess or on level load. If either case applies, or if the layer blending function contains high enough frequencies to introduce its own bumps, we can still generate a fully mixed LEAN map every frame.

We often use specular powers, s, in order of 256 up to 10-20,000. It is rare to use powers over 64 for ordinary bump mapping due to the sever aliasing problem, but LEAN mapping allows even extremely high specular powers. Since one bit change in an 8-bit texture component is $1/256$, we require 16-bit components to keep sufficient precision. With careful normalization into a 0-1 texture range, it is still possible use 8-bit textures and incorporate the constant 1/s factor at shading time. In this case, there will be some change in highlight shape at the base level due to rounding errors in the covariance reconstruction. FIGS. 2, 9($c,d$) and 10($c,d$) all use 8-bit LEAN maps, all other figures use 16-bit. In general, 8-bit textures only make sense if absolutely needed for speed or space.

Embodiments of LEAN mapping have been presented as a unified shading model representing both bump orientation and BRDF, with textures containing the 2D mean and second moment matrix of a Gaussian distribution in a projection plane defined by the underlying surface. This representation is easy enough to construct on the fly, or as a preprocess from either height-field or normal based bump maps. The terms combine linearly, so work with any standard texture filtering approach, including hardware-accelerated MIP pyramid construction, trilinear MIP sampling and anisotropic filtering. Embodiments of the present invention show how existing Blinn-Phong or Beckmann-distribution based shading models can be adapted to the new model, to produce visually equivalent results when filtering is not necessary, but correct filtering and antialiasing when it is needed. Effective bump antialiasing allows high specular powers of 10,000 or more. The low texture and computational overhead, along with the Blinn-Phong compatibility significantly eases adoption in an existing game art pipeline.

In embodiments of the present invention, a method, device, computer-readable instructions storable on a storage memory (e.g., processor memory, cloud, flashdrive, CDROM, other storage capability), and system are provided for mixing layers of bumps, allowing time-varying and/or spatial varying flow, decals and detail texture.

In the preceding specification, the present invention has been described with reference to specific example embodiments thereof. It will, however, be evident that various modifications and changes may be made thereunto without departing from the broader spirit and scope of the present invention as set forth in the claims that follow. The embodiments described herein may be combined with and without each other in various combinations. The specification and drawings are to be regarded in an illustrative rather than restrictive sense.

What is claimed is:

1. A method of rendering a computer generated 3D object, having an associated normal map containing bump normals, comprising:
    identifying a common plane perpendicular to a surface normal of the 3D object, wherein the common plane is displaced from the surface of the 3D object;
    projecting bump normals from the normal map into the common plane to create bump normal projections;
    linearly combining the bump normal projections to create an average normal;
    linearly combining second moments of the bump normal projections;
    deriving a covariance matrix from the average normal and the combined second moments;
    projecting a tangent space half-vector into the common plane;
    performing a 3D graphics lighting operation using the average normal, combined second moments and the projected half-vector.

2. The method of claim 1, wherein the 3D graphics lighting operation comprises a Beckman based lighting operation.

3. The method of claim 1, wherein the normal map is stored in a MIP layer.

4. The method of claim 3, further comprising a step of MIP filtering between multiple MIP layers.

5. The method of claim 1, wherein the normal map is stored in a Linear Efficient Antialiased Normal map.

6. The method of claim 5, further comprising blending two Linear Efficient Antialiased Normal map layers.

7. The method of claim 1, further comprising a generating a Linear Efficient Antialiased Normal map in a pre-processing step.

8. A non-transitory computer readable medium having stored thereon computer program instructions for rendering a computer generated 3D object, having an associated normal map containing bump normals, comprising:
   instructions identifying a common plane perpendicular to a surface normal of the 3D object, wherein the common plane is displaced from the surface of the 3D object;
   instructions projecting bump normals from the normal map into the common plane to create bump normal projections;
   instructions linearly combining the bump normal projections to create an average normal;
   instructions linearly combining second moments of the bump normal projections;
   instructions deriving a covariance matrix from the average normal and the combined second moments;
   instructions projecting a tangent space half-vector into the common plane;
   instructions performing a 3D graphics lighting operation using the average normal, combined second moments and the projected half-vector.

9. The computer readable medium of claim 8, wherein the 3D graphics lighting operation comprises a Beckman based lighting operation.

10. The computer readable medium of claim 8, wherein the normal map is stored in a MIP layer.

11. The computer readable medium of claim 10, further comprising a step of MIP filtering between multiple MIP layers.

12. The computer readable medium of claim 8, wherein the normal map is stored in a Linear Efficient Antialiased Normal map.

13. The computer readable medium of claim 12, further comprising blending two Linear Efficient Antialiased Normal map layers.

14. The computer readable medium of claim 8, further comprising a generating a Linear Efficient Antialiased Normal map in a pre-processing step.

\* \* \* \* \*